US011845144B2

(12) United States Patent
Matthews

(10) Patent No.: US 11,845,144 B2
(45) Date of Patent: Dec. 19, 2023

(54) ADDITIVE MANUFACTURING

(71) Applicant: LAWRENCE LIVERMORE NATIONAL SECURITY, LLC, Livermore, CA (US)

(72) Inventor: Manyalibo Joseph Matthews, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 792 days.

(21) Appl. No.: 16/971,027

(22) PCT Filed: Mar. 22, 2019

(86) PCT No.: PCT/US2019/023723
§ 371 (c)(1),
(2) Date: Aug. 19, 2020

(87) PCT Pub. No.: WO2019/183574
PCT Pub. Date: Sep. 26, 2019

(65) Prior Publication Data
US 2021/0039199 A1    Feb. 11, 2021

Related U.S. Application Data

(60) Provisional application No. 62/647,342, filed on Mar. 23, 2018.

(51) Int. Cl.
*B23K 26/354* (2014.01)
*B33Y 10/00* (2015.01)
(Continued)

(52) U.S. Cl.
CPC ............ *B23K 26/354* (2015.10); *B22F 10/28* (2021.01); *B22F 10/32* (2021.01); *B22F 10/73* (2021.01);
(Continued)

(58) Field of Classification Search
CPC ....... B23K 26/354; B23K 26/34; B22F 10/28; B22F 10/32; B22F 10/73; B22F 12/41;
(Continued)

(56) References Cited

U.S. PATENT DOCUMENTS 6,203,861 B1   3/2001  Kar et al.
9,527,165 B2  12/2016  Bruck et al.
(Continued)

FOREIGN PATENT DOCUMENTS

WO    2014-081694 A1    5/2014

OTHER PUBLICATIONS

International Search Report and Written Opinion for PCT/US2019/023723 corresponding to U.S. Appl. No. 16/971,027, 12 pages.
(Continued)

*Primary Examiner* — Robert G Bachner
(74) *Attorney, Agent, or Firm* — Eddie E. Scott

(57) ABSTRACT

A nanofluid laser entrainment additive manufacturing apparatus, system and method including a substrate, a dilute nanofluid of inert gas suspended nanoparticles on the substrate, a focused energy beam that irradiates the nanoparticles to selectively melt the nanoparticles, and a raster system that raster scans the focused energy beam across the inert gas suspended nanoparticles to create predetermined shapes by additive manufacturing.

27 Claims, 5 Drawing Sheets

(51) Int. Cl.
  *B33Y 30/00* (2015.01)
  *B33Y 70/00* (2020.01)
  *B23K 26/34* (2014.01)
  *B33Y 40/00* (2020.01)
  *B22F 10/28* (2021.01)
  *B22F 10/73* (2021.01)
  *B22F 12/41* (2021.01)
  *B22F 12/49* (2021.01)
  *B22F 12/70* (2021.01)
  *B22F 10/32* (2021.01)
  *B22F 12/00* (2021.01)
  *B22F 1/054* (2022.01)

(52) U.S. Cl.
  CPC .............. *B22F 12/41* (2021.01); *B22F 12/49* (2021.01); *B22F 12/70* (2021.01); *B23K 26/34* (2013.01); *B33Y 10/00* (2014.12); *B33Y 30/00* (2014.12); *B33Y 40/00* (2014.12); *B33Y 70/00* (2014.12); *B22F 1/054* (2022.01); *B22F 12/38* (2021.01)

(58) Field of Classification Search
  CPC .......... B22F 12/49; B22F 12/70; B22F 1/054; B22F 12/38; B22F 2999/00; B33Y 10/00; B33Y 30/00; B33Y 40/00; B33Y 70/00; Y02P 10/25; B29C 64/25; B29C 64/268; B29C 64/371
  See application file for complete search history.

(56) References Cited

U.S. PATENT DOCUMENTS

2002/0051853 A1  5/2002  Keicher et al.
2017/0090462 A1  3/2017  Dave et al.

OTHER PUBLICATIONS

Ly et al., "Metal vapor micro-jet control material redistribution in laser powder bed fusion additive manufacturing," Scientific Rpts, 7, 4085, 2017, pp. 1-11.
Matthews et al., "Denudation of metal powder in laser powder bed fusion processes," Acta Materialia, 114, 2016, pp. 33-42.
Rudyak, "Viscosity of Nanofluids—Why It Is Not Described by Classical Theories," Adv. in Nanoparticles, 2, 2013, pp. 266-279.

ADDITIVE MANUFACTURING

CROSS-REFERENCE TO RELATED APPLICATIONS

This application claims priority to and benefit under 35 U.S.C. § 119(e) of U.S. Provisional Patent Application No. 62/647,342 filed Mar. 23, 2018 entitled "Nanofluid Laser Entrainment Additive Manufacturing," the content of which is hereby incorporated by reference in its entirety for all purposes.

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present writing relates to additive manufacturing and more particularly to nanofluid laser entrainment additive manufacturing.

State of Technology

This section provides background information related to the present disclosure, which is not necessarily prior art.

Power bed fusion additive manufacturing feedstock has been limited to a minimum of ~5 um particles due to agglomeration of particles and inability to spread a layer for fusion. This limit in turn puts a lower bound on metal-based additive manufacturing feature size. The inventors avoid spreading by using a nano or micro fluid—suspension of particles in an inert gas—and using this as the feedstock. Similar to laser chemical vapor deposition (LCVD), deposition occurs at the location of the laser-heated spot. However, in this case the inventors use a recently discovered entrainment effect (Matthews et al. Acta Mat. 114 (2016) 33) that occurs when metal vapor causes a low pressure zone at the focal spot, drawing in surrounding argon cover gas and driving microparticles into a melt track during standard powder be ??? fusion processes. LCVD as a prior art for metal deposition, as well as Nanoscribe technologies using UV curable fluid and subsequent meal coating are slow processing methods, and in the latter case, limited to small volumes and metals that can be used (e.g. Ni). The inventor's apparatus, systems, and methods can scale to arbitrary volumes and build at much higher rates.

SUMMARY

Features and advantages of the disclosed apparatus, systems, and methods will become apparent from the following description. This writing, which includes drawings and examples of specific embodiments, are provided to give a broad representation of the apparatus, systems, and methods herein. Various changes and modifications within the scope of the application will become apparent to those skilled in the art from this description and by practice of the apparatus, systems, and methods. The scope of the apparatus, systems, and methods is not intended to be limited to the particular forms disclosed and this presentation covers all modifications, equivalents, and alternatives falling within the scope of the apparatus, systems, and methods as defined by the claims.

The inventor's apparatus, systems, and methods are useful for producing nano to microscale metal additive manufactured components using metal powders. Systems using metal powders are typically complicated by the inability to spread powders due to particle agglomeration. In the inventor's apparatus, systems, and methods, a dilute nanofluid of inert gas of suspended nanoparticles is used as the feedstock, through which a focused energy beam irradiates a surface to selectively melt particles to a substrate. The focused energy beam is then raster scanned across the surface to create predefined shapes for additive manufacturing of a product.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the scope of this writing as defined by the claims.

BRIEF DESCRIPTION OF THE DRAWINGS

The accompanying drawings, which are incorporated into and constitute a part of the specification herein, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Figure 1A:
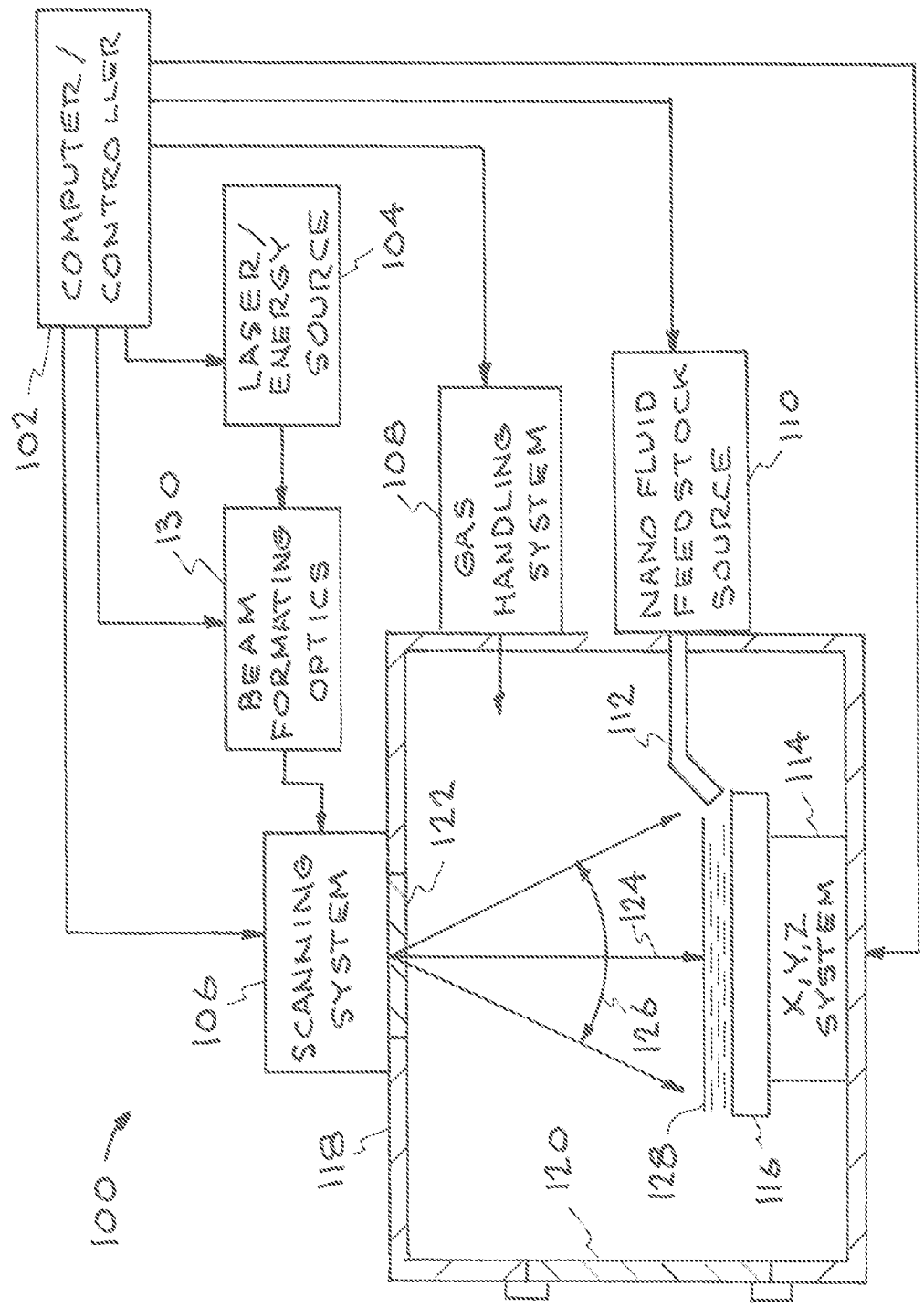
FIG. 1A illustrates a first embodiment of the inventor's apparatus, systems, and methods.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventor's apparatus, systems, and methods include a high numerical aperture lens coupled to a gas chamber in which a suspension of nano or micro particles exists statically or in a slow flow from a feed source. An energy beam is directed through the lens to form a focus at a build plane. The energy beam is rastered either through scan (galvanometer) mirrors or by moving a stage that the build substrate is mounted to. A de-agglomeration source may be included to break up the nano/microparticles, such as a vibrational diaphragm. The energy beam is adjusted so that sufficient evaporation occurs at the sample surface to drive a metal vapor jet, low pressure zone and ultimate entrainment of the particles such that they enter the laser beam path and melt selectively to form a feature. Features are then built up in 3D by moving the sample stage in XYZ.

Referring now to the drawing and in particular to FIG. 1A, a simplified schematic depiction illustrates a first embodiment of the inventor's apparatus, systems, and methods. The inventor's apparatus, systems, and methods are designated generally by the reference numeral 100. As illustrated, the first embodiment of the inventor's apparatus, systems, and methods 100 includes a number of components. The components of the first embodiment of the inventor's apparatus, systems, and methods 100 illustrated in FIG. 1A are identified and described below.

Reference Numeral 102—Computer/Controller,
Reference Numeral 104—Energy beam source,
Reference Numeral 106—Scanning system,
Reference Numeral 108—Gas handling system,
Reference Numeral 110—Feedstock of inert gas with suspended nanoparticles,
Reference Numeral 112—Nozzle,
Reference Numeral 114—X, Y, Z System,
Reference Numeral 116—Build plane (substrate),
Reference Numeral 118—Housing,
Reference Numeral 120—Door,
Reference Numeral 122—Window,
Reference Numeral 124—Energy beam,
Reference Numeral 126—Scan,
Reference Numeral 128—Nano particle layer; and
Reference Numeral 130—Beam formatting optics.

The identification and description of the first embodiment 100 components illustrated in FIG. 1A having been completed, the operation and additional description of the inventor's first embodiment 100 will now be considered in greater detail. The inventor's apparatus, systems, and methods 100 include a housing 118. A gas handling system 108 maintains an environment of inert gas in the housing 118. The housing 118 includes a door 120 and a window 122.

An energy beam source 104 directs an energy beam through beam formatting optics 130 to a scanning system 106 that directs the energy beam through the window 122 into the housing 118. The energy beam source 104 that produces an energy beam 124 can be any of the known energy beam sources and energy beams. For example, the energy beam source 104 that produces an energy beam 124 can be a laser beam source that produces a laser beam. Alternatively, the energy beam source 104 that produces an energy beam 124 can be an ion beam source that produces an ion beam.

A feedstock of inert gas with suspended nanoparticles 110 is directed into the housing 118 through a nozzle 112 onto a build plane (substrate) 116 producing a nanofluid layer 128 immediately above the build plane (substrate) 116. An X, Y, Z system 114 provides operational movement of the build plane 116.

The energy beam 124 that has entered the housing 118 through window 122 is directed onto the nanofluid layer 128 on the build plane (substrate) 116. The computer/controller 102 manages the system and produces a scan 126 of the energy beam 124 on the nanofluid layer 128. The X, Y, Z system 114 provides operational movement of the build plane (substrate) 116. Movement of the build plane (substrate) 116 and the scan 126 of the energy beam 124 operate to produce a product or part through well know fusion-based additive manufacturing procedures.

Figure 1B:
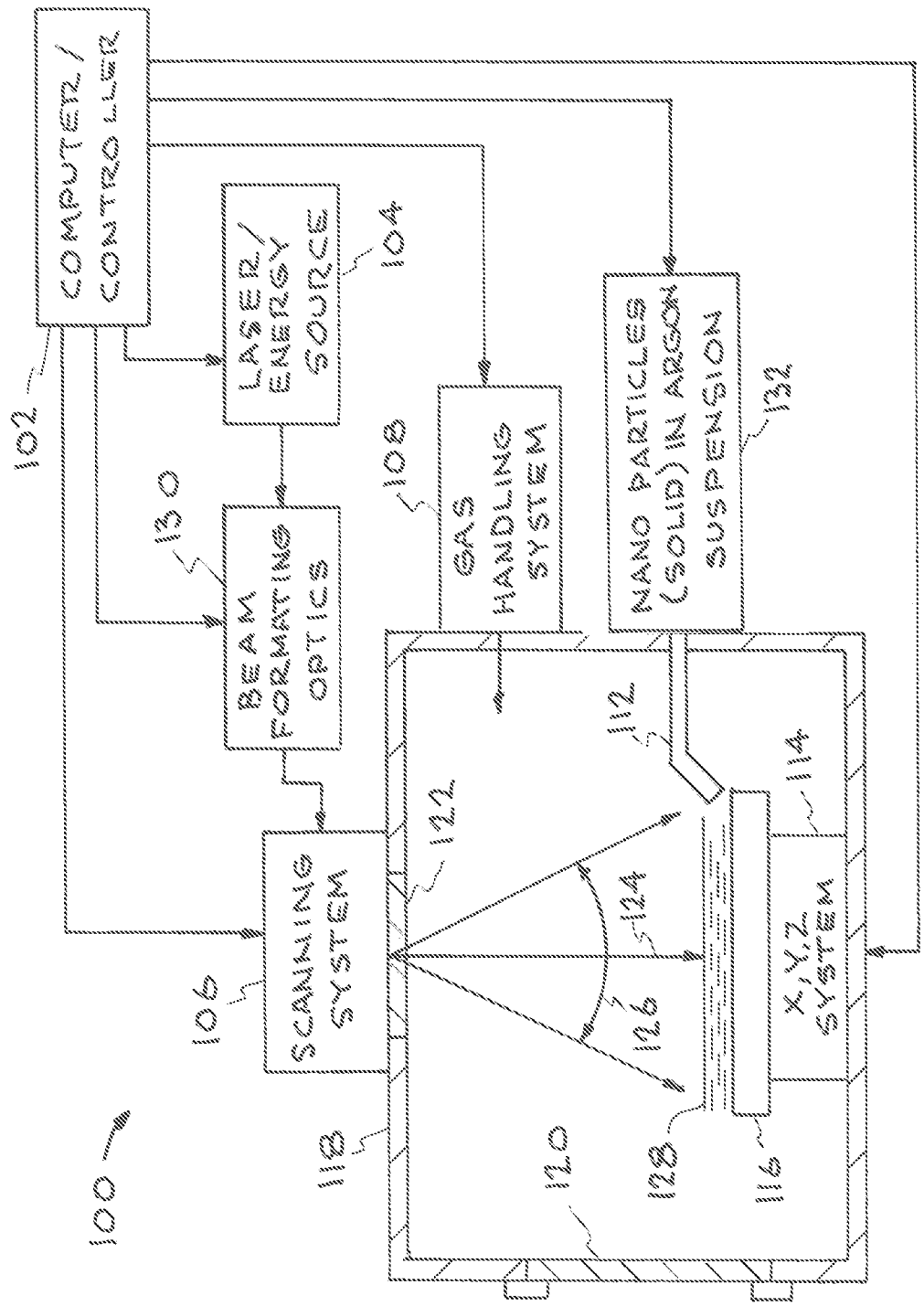
FIG. 1B illustrates a second embodiment of the inventor's apparatus, systems, and methods.

Referring now to the drawing and in particular to FIG. 1B, a simplified schematic depiction illustrates a second embodiment of the inventor's apparatus, systems, and methods. The second embodiment includes the components of FIG. 1A with a more detailed and specific illustration and description of the Feedstock of inert gas with suspended nanoparticles 110 component. As illustrated in FIG. 1B, the second embodiment of the inventor's apparatus, systems, and methods 100 includes a number of components. The components of the second embodiment of the inventor's apparatus, systems, and methods 100 illustrated in FIG. 1B are identified and described below.

Reference Numeral 102—Computer/Controller,
Reference Numeral 104—Energy beam source,
Reference Numeral 106—Scanning system,
Reference Numeral 108—Gas handling system,
Reference Numeral 112—Nozzle,
Reference Numeral 114—X, Y, Z System,
Reference Numeral 116—Build plane (substrate),
Reference Numeral 118—Housing,
Reference Numeral 120—Door,
Reference Numeral 122—Window,
Reference Numeral 124—Energy beam,
Reference Numeral 126—Scan,
Reference Numeral 128—Nano particle layer,
Reference Numeral 130—Beam formatting optics, and
Reference Numeral 132—Nano particles (solid) in Argon suspension.

The identification and description of the second embodiment 100 components illustrated in FIG. 1B having been completed, the operation and additional description of the inventor's second embodiment 100 will now be considered in greater detail. The inventor's apparatus, systems, and methods 100 include a housing 118. The housing 118 includes a door 120 and a window 122.

A gas handling system 108 maintains an environment of inert gas in the housing 118. A feedstock of nano particles (solid) in Argon suspension 132 is directed into the housing 118 through a nozzle 112 onto a build plane (substrate) 116 producing a nanofluid layer 128 on the build plane (substrate) 116.

An energy beam source 104 directs an energy beam through beam formatting optics 130 to a scanning system 106 that directs the energy beam through the window 122 into the housing 118. An X, Y, Z system 114 provides operational movement of the build plane 116. The energy beam 124 that has entered the housing 118 through window 122 is directed onto the nanofluid layer 128 on the build plane (substrate) 116. The computer/controller 102 manages the system and produces a scan 126 of the energy beam 124 on the nanofluid layer 128. The X, Y, Z system 114 provides operational movement of the build plane (substrate) 116. Movement of the build plane (substrate) 116 and the scan 126 of the energy beam 124 operate to produce a product or part through well-known additive manufacturing procedures.

Figure 1C:
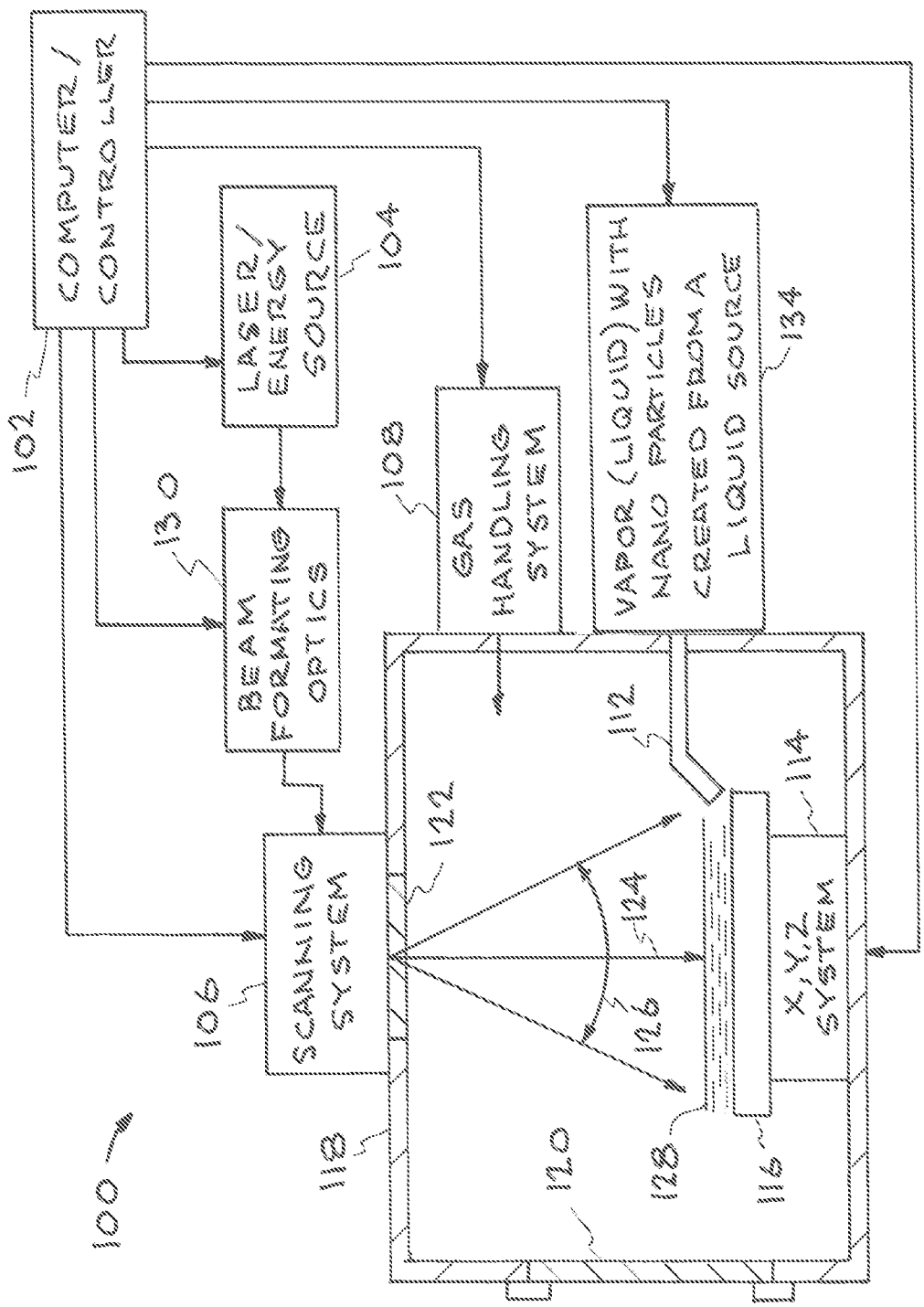
FIG. 1C illustrates a third embodiment of the inventor's apparatus, systems, and methods.

Referring now to the drawings and in particular to FIG. 1C, a simplified schematic depiction illustrates a third embodiment of the inventor's apparatus, systems, and methods. The third embodiment includes the components of FIG. 1A with a more detailed and specific illustration and description of the Feedstock of inert gas with suspended nanoparticles 110 component. As illustrated in FIG. 1C, the third embodiment of the inventor's apparatus, systems, and methods 100 includes a number of components. The components of the third embodiment of the inventor's apparatus, systems, and methods 100 illustrated in FIG. 1C are identified and described below.

Reference Numeral 102—Computer/Controller,
Reference Numeral 104—Energy beam source,
Reference Numeral 106—Scanning system,
Reference Numeral 108—Gas handling system,
Reference Numeral 112—Nozzle,
Reference Numeral 114—X, Y, Z System,
Reference Numeral 116—Build plane (substrate),
Reference Numeral 118—Housing,
Reference Numeral 120—Door,
Reference Numeral 122—Window,
Reference Numeral 124—Energy beam,
Reference Numeral 126—Scan,
Reference Numeral 128—Nano particle layer,
Reference Numeral 130—Beam formatting optics, and
Reference Numeral 134—Vapor (liquid) with nano particles, created from a liquid source.

The identification and description of the third embodiment 100 components illustrated in FIG. 1C having been completed, the operation and additional description of the inventor's third embodiment 100 will now be considered in greater detail. The inventor's apparatus, systems, and methods 100 include a housing 118. The housing 118 includes a door 120 and a window 122.

A gas handling system 108 maintains an environment of inert gas in the housing 118. A vapor (liquid) comprised of nano particle condensate and created from a liquid source 134 is directed into the housing 118 through a nozzle 112 onto a build plane (substrate) 116 producing a nanofluid layer 128 on the build plane (substrate) 116.

An energy beam source 104 directs an energy beam through beam formatting optics 130 to a scanning system 106 that directs the energy beam through the window 122 into the housing 118. An X, Y, Z system 114 provides operational movement of the build plane 116. The energy beam 124 that has entered the housing 118 through window 122 is directed onto the nanofluid layer 128 on the build plane (substrate) 116. The computer/controller 102 manages the system and produces a scan 126 of the energy beam 124 on the nanofluid layer 128. The X, Y, Z system 114 provides operational movement of the build plane (substrate) 116. Movement of the build plane (substrate) 116 and the scan 126 of the energy beam 124 operate to produce a product or part through well-known additive manufacturing procedures.

Figure 2:
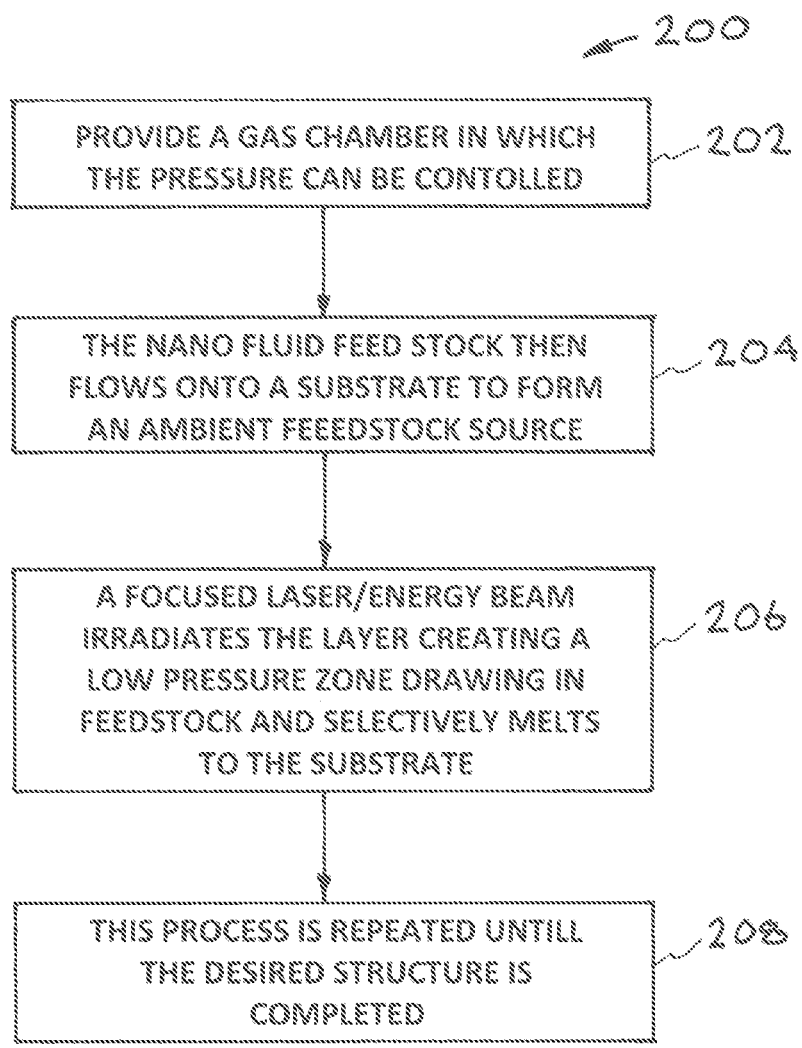
FIG. 2 is a flow chart that provides additional information about the inventor's apparatus, systems, and methods.

Referring now to FIG. 2, a flow chart provides additional information about the inventor's apparatus, systems, and methods 100 described above. The flow chart is designated generally by the reference numeral 200. The steps of the flow chart 200 are identified and described below.

Reference Numeral 202—Provide a gas chamber in which the pressure can be controlled,
Reference Numeral 204—The nanofluid feed stock then flows onto a substrate to form an ambient feedstock source,
Reference Numeral 206—A focused laser/energy beam irradiates the layer creating a low pressure zone drawing in feedstock and selectively melts particles to the substrate (or selectively melts particles to the previously formed layer), and
Reference Numeral 208—This process is repeated until the desired structure is competed.

The identification and description of the steps illustrated in FIG. 2 having been completed, additional description of the inventor's apparatus, systems, and methods will now be considered in greater detail. The inventor's apparatus, systems, and methods provides nanofluid laser entrainment additive manufacturing method steps 200 that include a feedstock of inert gas (with suspended nano-particles); a focused laser beam that irradiates a surface to selectively melt particles to a build plane; and a raster system that raster scans the laser beam across the surface to create the desired shape of a product by additive manufacturing.

The inventor's apparatus, systems, and methods 100 include the provision of a housing. A gas handling system maintains an environment of inert gas in the housing. An energy beam source directs an energy beam through beam formatting optics to a scanning system that directs the energy beam through a window into the housing. The energy beam source that produces an energy beam can be any of the know energy beam sources and energy beams. A feedstock of inert gas with suspended nanoparticles is directed into the housing through a nozzle onto a build plane (substrate) producing a nanofluid layer on the build plane (substrate). An X, Y, Z system provides operational movement of the build plane. The energy beam that has entered the housing through the window is directed onto the nanofluid layer on the build plane (substrate). The computer/controller manages the system and produces a scan of the energy beam on the nanofluid layer. The X, Y, Z system provides operational movement of the build plane (substrate). Movement of the build plane (substrate) and the scan of the energy beam operate to produce a product or part through well-known additive manufacturing procedures.

As illustrated in FIG. 2, the laser beam is focused through the dilute nanofluid of metal particles. Away from the build plane surface, the intensity of light is such that particles are not sufficiently melted while at the surface melting would occur. Once a laser-heated melt pool is established, vapor emanating from high temperature (central) regions drive an upward fluid jet that causes a low-pressure zone due to the Bernoulli effect. Ar (or other inert gas) flowing inward will entrain nearby particles that are subsumed into the melt track, cast away and back into the suspension or intersect the laser beam and are heated prior to re-entering the colder suspension. Tuning of the process can be performed to maximize melt track consolidation over other particle transport effects.

Figure 3:
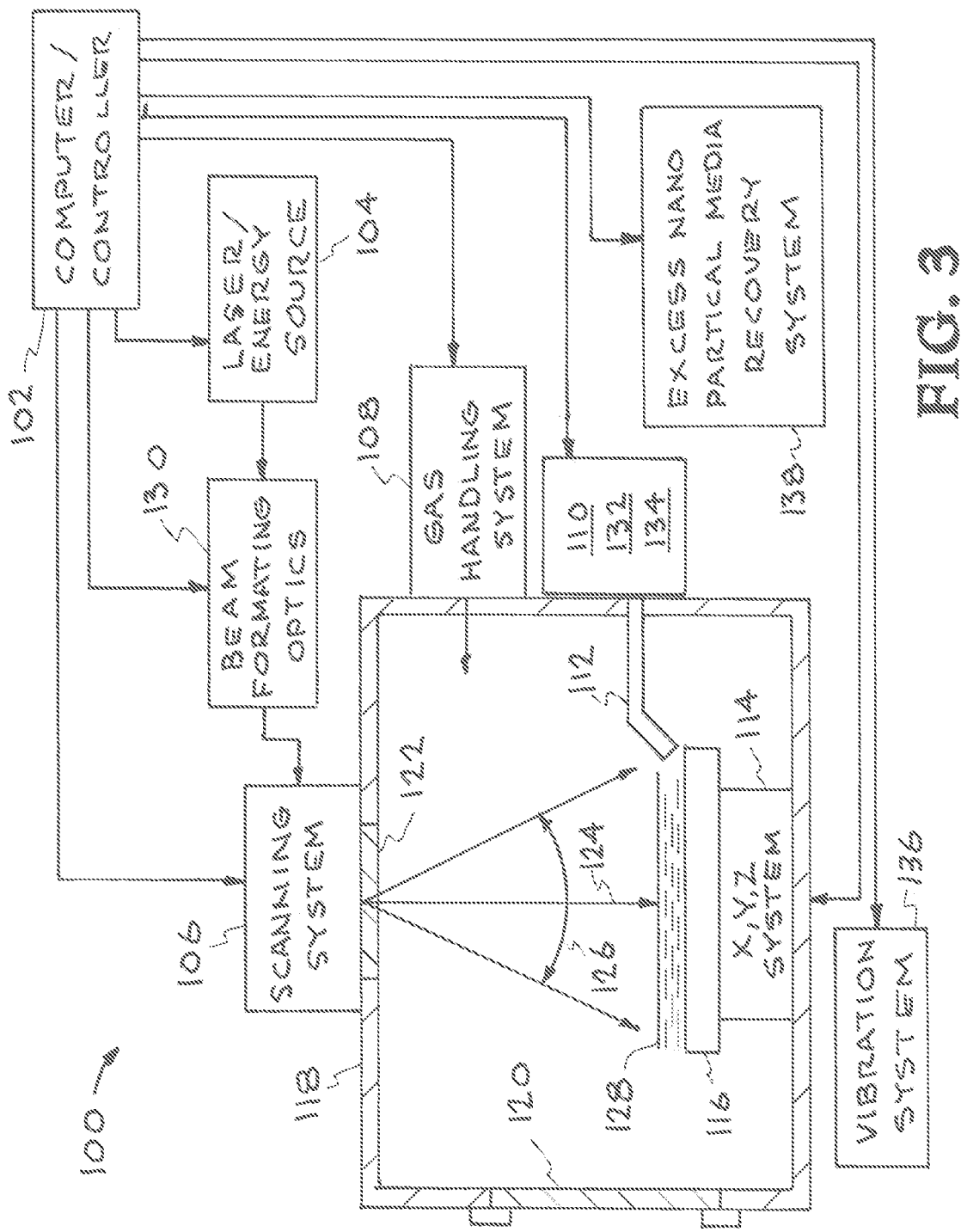
FIG. 3 illustrates another embodiment of the inventor's apparatus, systems, and methods.

Referring now to FIG. 3, a simplified schematic depiction illustrates another embodiment of the inventor's apparatus, systems, and methods. The reference numerals used in FIG. 3 are the same as the reference numerals used in FIGS. 1A, 1B, and 1C for like parts. This additional embodiment is designated generally by the reference numeral 100 as in FIGS. 1A, 1B, and 1C. As illustrated, the additional embodiment 100 includes a number of components. The components illustrated in FIG. 3 are identified and described below.

Reference Numeral 102—Computer/Controller,
Reference Numeral 104—Energy beam source,
Reference Numeral 106—Scanning system,
Reference Numeral 108—Gas handling system,
Reference Numeral 110—Feedstock of inert gas with suspended nanoparticles,
Reference Numeral 112—Nozzle,
Reference Numeral 114—X, Y, Z System,
Reference Numeral 116—Build plane (substrate),
Reference Numeral 118—Housing,
Reference Numeral 120—Door,
Reference Numeral 122—Window,
Reference Numeral 124—Energy beam,
Reference Numeral 126—Scan, Reference Numeral 128—Nano particle layer;
Reference Numeral 130—Beam formatting optics,
Reference Numeral 132—Nano particles (solid) in Argon suspension,
Reference Numeral 134—Vapor (liquid) with nano particles, created from a liquid source,
Reference Numeral 136—Vibration system, and
Reference Numeral 138—Excess nano particle media recovery system.

The identification and description of the additional embodiment components illustrated in FIG. 3 having been completed, the operation and additional description of the inventor's additional embodiment will now be considered in greater detail. The inventor's apparatus, systems, and methods 100 include a housing 118. A gas handling system 108 maintains an environment of inert gas in the housing 118. The housing 118 includes a door 120 and a window 122.

An energy beam source 104 directs an energy beam through beam formatting optics 130 to a scanning system 106 that directs the energy beam through the window 122 into the housing 118. The energy beam source 104 that produces an energy beam 124 can be any of the know energy beam sources and energy beams. For example, the energy beam source 104 that produces an energy beam 124 can be a laser beam source that produces a laser beam. Alternatively, the energy beam source 104 that produces an energy beam 124 can be an ion beam source that produces an ion beam.

A feedstock of inert gas with suspended nanoparticles 110 is directed into the housing 118 through a nozzle 112 onto a build plane (substrate) 116 producing a nanofluid layer 128 on the build plane (substrate) 116. An X, Y, Z system 114 provides operational movement of the build plane 116.

Alternatively, a gas handling system 108 maintains an environment of inert gas in the housing 118. A feedstock of nano particles (solid) in Argon suspension 132 is directed into the housing 118 through a nozzle 112 onto a build plane (substrate) 116 producing a nanofluid layer 128 on the build plane (substrate) 116.

Alternatively, a gas handling system 108 maintains an environment of inert gas in the housing 118. A vapor (liquid) with nano particles, created from a liquid source 134 is directed into the housing 118 through a nozzle 112 onto a build plane (substrate) 116 producing a nanofluid layer 128 on the build plane (substrate) 116.

The energy beam 124 that has entered the housing 118 through window 122 is directed onto the nanofluid layer 128 on the build plane (substrate) 116. The computer/controller 102 manages the system and produces a scan 126 of the energy beam 124 on the nanofluid layer 128. The X, Y, Z system 114 provides operational movement of the build plane (substrate) 116. Movement of the build plane (substrate) 116 and the scan 126 of the energy beam 124 operate to produce a product or part through well-known additive manufacturing procedures.

A vibration system 136 is connected to the X, Y, Z system 114 for creating vibrational movement of the substrate 116. This provides a de-agglomeration source to break up clusters of the nano/microparticles.

The laser beam is focused through the dilute nanofluid of nano particles. Away from the build plane surface, the intensity of light is such that all of the nano particles are not sufficiently melted while at the surface melting would occur. Furthermore, wavelength tuning of the laser can be applied to minimize plasmonic coupling to the nanoparticles while maximizing laser absorption as the substrate. Once a laser-heated melt pool is established, vapor emanating from high temperature (central) regions drive an upward fluid jet that causes a low-pressure zone due to the Bernoulli effect. Ar (or other inert gas) flowing inward will entrain nearby particles that are subsumed into the melt track, cast away and back into the suspension or intersect the laser beam and are heated prior to re-entering the colder suspension. A recovery system 138 collects excess nano particles. The recovery system 138 is connected to the housing 118 and operates to collect excess nano particles within the inert gas environment.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments, which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that this presentation is not intended to be limited to the particular forms disclosed. Rather, this presentation is meant to cover all modifications, equivalents, and alternatives falling within the scope of the application as defined by the following appended claims.

All elements, parts and steps described herein are preferably included. It is to be understood that any of these elements, parts and steps may be replaced by other elements, parts and steps or deleted altogether as will be obvious to those skilled in the art.

Broadly, this writing presents at least the following:

a Nano fluid laser entrainment additive manufacturing apparatus, system and method including a substrate, a dilute Nano fluid of inert gas suspended nanoparticles on the substrate, a focused energy beam that irradiates the nanoparticles to selectively melt the nanoparticles, and a raster system that raster scans the focused energy beam across the inert gas suspended nanoparticles to create predetermined shapes by additive manufacturing.

This writing discloses at least the following Concepts.

Concept 1. An additive manufacturing apparatus, comprising:
 a substrate;
 inert gas;
 Nanoparticles;
 a Nano fluid of said inert gas and said nanoparticles, wherein said Nano fluid of said inert gas and said nanoparticles is operatively positioned relative to said substrate;
 a focused energy beam system;
 an energy beam produced by said focused energy beam system, wherein said energy beam irradiates said nanoparticles to melt said nanoparticles; and
 a scanning system that raster scans said energy beam across said Nano fluid of said inert gas and said nanoparticles to melt said nanoparticles and create predetermined shapes by additive manufacturing.

Concept 2. The additive manufacturing apparatus of Concept 1 wherein said focused energy beam system includes beam-formatting optics.

Concept 3. The additive manufacturing apparatus of Concepts 1 and 2 wherein said focused energy beam system comprises a focused laser beam system and wherein said energy beam produced by said focused energy beam system comprises a laser beam.

Concept 4. The additive manufacturing apparatus of Concepts 1 and 2 wherein said focused energy beam system comprises a focused ion beam system and wherein said energy beam produced by said focused energy beam system comprises an ion beam.

Concept 5. The additive manufacturing apparatus of Concepts 1, 2, 3, and 4 further comprising a housing that surrounds said substrate, said nanofluid of said inert gas and said nanoparticles, and said energy beam.

Concept 6. The additive manufacturing apparatus of Concepts 1, 2, 3, 4, and 5 further comprising a gas handling system operatively connected to said housing that produces an environment of said inert gas in said housing.

Concept 7. The additive manufacturing apparatus of Concepts 1, 2, 3, 4, 5, and 6 wherein said gas handling system operatively connected to said housing provides said nanofluid of said inert gas and said nanoparticles operatively positioned relative to said substrate.

Concept 8. The additive manufacturing apparatus of Concepts 1, 2, 3, 4, 5, 6, and 7 wherein said gas-handling system comprises a system for producing a nanofluid of said nanoparticles in argon gas.

Concept 9. The additive manufacturing apparatus of Concepts 1, 2, 3, 4, 5, 6, 7, and 8 wherein said gas handling system comprises a vapor system that utilizes liquid containing said nanoparticles for producing a Nano fluid of said nanoparticles in said inert gas.

Concept 10. The additive manufacturing apparatus of Concepts 1, 2, 3, 4, 5, 6, 7, 8, and 9 wherein said energy beam that irradiates said nanoparticles wherein said energy beam that irradiates said nanoparticles creates a gas flow and wherein said energy beam that irradiates said nanoparticles to melt said nanoparticles leaves some nanoparticles un-melted and wherein said un-melted nanoparticles are entrained in said gas flow created by said energy beam.

Concept 11. The additive manufacturing apparatus of Concepts 1, 2, 3, 4, 5, 6, 7, 8, 9, and 10 wherein said scanning system includes a X, Y, Z system that provides operational movement of said substrate.

Concept 12. The additive manufacturing apparatus of Concepts 1, 2, 3, 4, 5, 6, 7, 8, 9, 10, and 11 wherein said scanning system includes a raster scan system of said energy beam and a X, Y, Z system that provides operational movement of said substrate.

Concept 13. The additive manufacturing apparatus of Concepts 1, 2, 3, 4, 5, 6, 7, 8, 9, 10, 11, and 12 further comprising a vibration system for creating vibrational movement of said substrate.

Concept 14. An additive manufacturing apparatus, comprising:
 a substrate;
 inert gas;
 Nanoparticles;
 a Nano fluid of said inert gas and said nanoparticles, wherein said Nano fluid of said inert gas and said nanoparticles is operatively positioned relative to said substrate;
 a focused laser beam system;
 a laser beam produced by said focused laser beam system, wherein said laser beam irradiates said nanoparticles to melt said nanoparticles;
 a housing that surrounds said substrate, said Nano fluid of said inert gas and said nanoparticles, and said laser beam;
 a gas handling system operatively connected to said housing that produces an environment of said inert gas in said housing; and
 a scanning system that raster scans said laser beam across said Nano fluid of said inert gas and said nanoparticles to melt said nanoparticles and create predetermined shapes by additive manufacturing.

Concept 15. The additive manufacturing apparatus of Concept 14 wherein said focused laser beam system includes beam-formatting optics.

Concept 16. The additive manufacturing apparatus of claim Concepts 14 and 15 wherein said gas handling system operatively connected to said housing provides said Nano fluid of said inert gas and said nanoparticles operatively positioned relative to said substrate.

Concept 17. The additive manufacturing apparatus of Concepts 14, 15, and 16 wherein said gas-handling system comprises a system for producing a Nano fluid of said nanoparticles in argon gas.

Concept 18. The additive manufacturing apparatus of Concepts 14, 15, 16, and 17 wherein said gas handling system comprises a vapor system that utilizes liquid containing said nanoparticles for producing a Nano fluid of said nanoparticles in said inert gas.

Concept 19. The additive manufacturing apparatus of Concepts 14, 15, 16, 17, and 18 wherein said laser beam that irradiates said nanoparticles to melt said nanoparticles leaves some nanoparticles un-melted and wherein said un-melted nanoparticles are entrained in the gas flow created by said laser beam.

Concept 20. The additive manufacturing apparatus of Concepts 14, 15, 16, 17, 18, and 19 wherein said scanning system includes a X, Y, Z system that provides operational movement of said substrate.

Concept 21. The additive manufacturing apparatus of Concepts 14, 15, 16, 17, 18, 19, and 20 wherein said scanning system includes a raster scan system of said laser beam and a X, Y, Z system that provides operational movement of said substrate.

Concept 22. The additive manufacturing apparatus of Concepts 14, 15, 16, 17, 18, 19, 20, and 21 further comprising a vibration system for creating vibrational movement of said substrate.

Concept 23. A Nano fluid laser entrainment additive manufacturing method, comprising the steps of:
providing a housing,
providing a substrate in said housing,
providing a dilute Nano fluid of inert gas suspended nanoparticles in said housing,
directing said dilute Nano fluid of inert gas suspended nanoparticles to said substrate, and
directing a focused energy beam to said dilute Nano fluid of inert gas suspended nanoparticles to irradiate said nanoparticles and selectively melt said nanoparticles and create predetermined shapes by additive manufacturing.

Concept 24. The Nano fluid laser entrainment additive manufacturing method of Concept 23 further comprising the step of creating an inert gas environment in said housing.

Concept 25. The Nano fluid laser entrainment additive manufacturing method of Concepts 23 and 24 wherein said step of directing a focused energy beam to said dilute Nano fluid of inert gas suspended nanoparticles comprises directing a focused laser beam to said dilute Nano fluid of inert gas suspended nanoparticles.

Concept 26. The Nano fluid laser entrainment additive manufacturing method of Concepts 23, 24, and 25 wherein said step of directing a focused energy beam to said dilute Nano fluid of inert gas suspended nanoparticles comprises directing a focused ion beam to said dilute Nano fluid of inert gas suspended nanoparticles.

Concept 27. The Nano fluid laser entrainment additive manufacturing method of Concepts 23, 24, 25, and 26 wherein said step of directing a focused energy beam to said dilute Nano fluid of inert gas suspended nanoparticles to irradiate said nanoparticles and selectively melt said nanoparticles leaves some nanoparticles un-melted and further comprising the step of collecting said un-melted nanoparticles.

The invention claimed is:

1. An additive manufacturing apparatus, comprising:
a substrate;
inert gas;
Nanoparticles;
a nanofluid of said inert gas and said nanoparticles, wherein said nanofluid of said inert gas and said nanoparticles is operatively positioned relative to said substrate;
a focused energy beam system;
an energy beam produced by said focused energy beam system, wherein said energy beam irradiates said nanoparticles to melt said nanoparticles; and
a scanning system that raster scans said energy beam across said nanofluid of said inert gas and said nanoparticles to melt said nanoparticles and create predetermined shapes by additive manufacturing.

2. The additive manufacturing apparatus of claim 1 wherein said focused energy beam system includes beam-formatting optics.

3. The additive manufacturing apparatus of claim 1 wherein said focused energy beam system comprises a focused laser beam system and wherein said energy beam produced by said focused energy beam system comprises a laser beam.

4. The additive manufacturing apparatus of claim 1 wherein said focused energy beam system comprises a focused ion beam system and wherein said energy beam produced by said focused energy beam system comprises an ion beam.

5. The additive manufacturing apparatus of claim 1 further comprising a housing that surrounds said substrate, said nanofluid of said inert gas and said nanoparticles, and said energy beam.

6. The additive manufacturing apparatus of claim 5 further comprising a gas handling system operatively connected to said housing that produces an environment of said inert gas in said housing.

7. The additive manufacturing apparatus of claim 6 wherein said gas handling system operatively connected to said housing provides said nanofluid of said inert gas and said nanoparticles operatively positioned relative to said substrate.

8. The additive manufacturing apparatus of claim 6 wherein said gas-handling system comprises a system for producing a nanofluid of said nanoparticles in argon gas.

9. The additive manufacturing apparatus of claim 6 wherein said gas-handling system comprises a vapor system that utilizes liquid containing said nanoparticles for producing a nanofluid of said nanoparticles in said inert gas.

10. The additive manufacturing apparatus of claim 1 wherein said energy beam that irradiates said nanoparticles wherein said energy beam that irradiates said nanoparticles creates a gas flow and wherein said energy beam that irradiates said nanoparticles to melt said nanoparticles leaves some nanoparticles un-melted and wherein said un-melted nanoparticles are entrained in said gas flow created by said energy beam.

11. The additive manufacturing apparatus of claim 1 wherein said scanning system includes a X, Y, Z system that provides operational movement of said substrate.

12. The additive manufacturing apparatus of claim 1 wherein said scanning system includes a raster scan system of said energy beam and a X, Y, Z system that provides operational movement of said substrate.

13. The additive manufacturing apparatus of claim 1 further comprising a vibration system for creating vibrational movement of said substrate.

14. An additive manufacturing apparatus, comprising:
a substrate;
inert gas;
Nanoparticles;
a nanofluid of said inert gas and said nanoparticles, wherein said nanofluid of said inert gas and said nanoparticles is operatively positioned relative to said substrate;
a focused laser beam system;
a laser beam produced by said focused laser beam system, wherein said laser beam irradiates said nanoparticles to melt said nanoparticles;

a housing that surrounds said substrate, said nanofluid of said inert gas and said nanoparticles, and said laser beam;

a gas handling system operatively connected to said housing that produces an environment of said inert gas in said housing; and a scanning system that raster scans said laser beam across said nanofluid of said inert gas and said nanoparticles to melt said nanoparticles and create predetermined shapes by additive manufacturing.

15. The additive manufacturing apparatus of claim 14 wherein said focused laser beam system includes beam-formatting optics.

16. The additive manufacturing apparatus of claim 14 wherein said gas handling system operatively connected to said housing provides said nanofluid of said inert gas and said nanoparticles operatively positioned relative to said substrate.

17. The additive manufacturing apparatus of claim 14 wherein said gas-handling system comprises a system for producing a nanofluid of said nanoparticles in argon gas.

18. The additive manufacturing apparatus of claim 14 wherein said gas-handling system comprises a vapor system that utilizes liquid containing said nanoparticles for producing a nanofluid of said nanoparticles in said inert gas.

19. The additive manufacturing apparatus of claim 14 wherein said laser beam that irradiates said nanoparticles to melt said nanoparticles leaves some nanoparticles un-melted and wherein said un-melted nanoparticles are entrained in the gas flow created by said laser beam.

20. The additive manufacturing apparatus of claim 14 wherein said scanning system includes a X, Y, Z system that provides operational movement of said substrate.

21. The additive manufacturing apparatus of claim 14 wherein said scanning system includes a raster scan system of said laser beam and a X, Y, Z system that provides operational movement of said substrate.

22. The additive manufacturing apparatus of claim 14 further comprising a vibration system for creating vibrational movement of said substrate.

23. A nanofluid laser entrainment additive manufacturing method, comprising the steps of:
providing a housing,
providing a substrate in said housing,
providing a dilute nanofluid of inert gas suspended nanoparticles in said housing,
directing said dilute nanofluid of inert gas suspended nanoparticles to said substrate, and
directing a focused energy beam to said dilute nanofluid of inert gas suspended nanoparticles to irradiate said nanoparticles and selectively melt said nanoparticles and creates predetermined shapes by additive manufacturing.

24. The nanofluid laser entrainment additive manufacturing method of claim 23 further comprising the step of creating an inert gas environment in said housing.

25. The nanofluid laser entrainment additive manufacturing method of claim 23 wherein said step of directing a focused energy beam to said dilute nanofluid of inert gas suspended nanoparticles comprises directing a focused laser beam to said dilute nanofluid of inert gas suspended nanoparticles.

26. The nanofluid laser entrainment additive manufacturing method of claim 23 wherein said step of directing a focused energy beam to said dilute nanofluid of inert gas suspended nanoparticles comprises directing a focused ion beam to said dilute nanofluid of inert gas suspended nanoparticles.

27. The nanofluid laser entrainment additive manufacturing method of claim 23 wherein said step of directing a focused energy beam to said dilute nanofluid of inert gas suspended nanoparticles to irradiate said nanoparticles and selectively melt said nanoparticles leaves some nanoparticles un-melted and further comprising the step of collecting said un-melted nanoparticles.

\* \* \* \* \*